United States Patent [19]

Hayashi et al.

[11] Patent Number: 4,809,325

[45] Date of Patent: Feb. 28, 1989

[54] RECEIVER FOR PAY TELEVISION

[75] Inventors: Toshihide Hayashi, Tokyo; Ikuo Kanayama, Kanagawa; Masayoshi Kanno, Tokyo, all of Japan

[73] Assignee: Sony Corporation, Tokyo, Japan

[21] Appl. No.: 82,999

[22] Filed: Aug. 5, 1987

Related U.S. Application Data

[63] Continuation of Ser. No. 803,007, Nov. 29, 1985.

[30] Foreign Application Priority Data

Nov. 29, 1984 [JP] Japan .................................. 59-252185
Nov. 29, 1984 [JP] Japan .................................. 59-252186

[51] Int. Cl.$^4$ ........................ H04N 7/167; H04N 7/10
[52] U.S. Cl. ........................................ 380/20; 358/84; 380/16
[58] Field of Search .................. 371/36; 380/20, 16; 358/84

[56] References Cited

U.S. PATENT DOCUMENTS

| | | |
|---|---|---|
| 3,508,005 | 4/1970 | Hamburger .................. 358/84 |
| 3,863,215 | 1/1975 | McGrogan ..................... 371/36 |
| 4,390,898 | 6/1983 | Bond et al. .................... 358/119 |
| 4,484,217 | 11/1984 | Block et al. ................... 358/122 |
| 4,673,976 | 6/1987 | Wreford ........................ 380/10 |
| 4,712,238 | 12/1987 | Gilhousen et al. ............ 380/20 |

Primary Examiner—Stephen C. Buczinski
Attorney, Agent, or Firm—Hill, Van Santen, Steadman & Simpson

[57] ABSTRACT

A payment control apparatus for a pay television system includes a detector for detecting an advance fee data group transmitted from a center. An advance memory coupled to the detector stores the advanced fee data group. An error check controller coupled to the detector detects errors in the advance fee data group. A display coupled to the error check controller displays error conditions in the advance fee data group.

7 Claims, 9 Drawing Sheets

```
  DEPOSIT  BALANCE  DATE
CH 2· $ 20  →  $ 27  :  SEP  15
CH 6· $ 30  →  $ 41  :  OCT   4
CH14· $ 50  →  $ 72  :  JUL  25
CH23· $ 70  →  $ 94  :  AUG  31
```

FIG. I

```
        DEPOSIT    BALANCE    DATE
CH 2 · $ 20  →  $ 27  :  SEP  15
CH 6 · $ 30  →  $ 41  :  OCT   4
CH14 · $ 50  →  $ 72  :  JUL  25
CH23 · $ 70  →  $ 94  :  AUG  31
```

RECEIVER FOR PAY TELEVISION

This is a continuation of application Ser. No. 803,007, filed Nov. 29, 1985.

BACKGROUND OF THE INVENTION

The present invention relates to a receiver for pay television.

In a conventional pay per view system for collecting listening fees, a broadcast center (i.e., a broadcast station) mails program schedules to each user in advance. The user calls the center with predetermined data before a desired program is to be broadcast (e.g., a week or a day beforehand) so as to reserve the desired program, if any. When the desired program is on the air, the center sends an ID signal to a user who has reserved the corresponding program. When a user's receiver or decoder in the receiver receives the ID signal, a scrambled program signal is descrambled by the decoder.

The pay per view system described above has the following disadvantages:

(A) the user must call the center to reserve the desired program, (B) each program has a reservation due date, so that the user cannot reserve the desired program when the reservation due date has passed, (C) fees cannot be refunded even if the user does not watch the reserved program, and (D) a spare time is required to send the ID signal to all reserved users at the beginning of every reserved program.

In another conventional pay per view system, a pay per view status signal is sent from the center to each user. When the user wishes to watch a program represented by the pay per view status signal, he depresses a pay per view switch arranged in a decoder in a tuner. The scrambled program is then descrambled, and the user can watch the program. When the user actually watches the program, charge data corresponding to the subscribed program are stored in a memory in the decoder. The center periodically checks the contents of the memory of each decoder through a telephone line and collects fees or bills the charge.

This conventional pay per view system can solve the drawbacks of the first conventional system. However, since the center must periodically check the memories of all users, the check system is complicated. Furthermore, since fee collection is performed through a telephone line, an auto dial unit and a modem (modulator/demodulator) are required, so that the user terminal and the station apparatus are complex and of high-cost.

Another pay per view system is proposed. In this system a user deposits a monetary advance to the broadcast station through a bank or the like, and the broadcast station sends the advance data together with ID (or address) data to the user via a PCM region of a TV broadcast channel. The advance data representing the deposit is stored in the advance memory of the receiver of the user. Every time the user watches a pay program, a program fee is subtracted from the advance data. According to this system, no modem for connecting the receiver to the telephone line is required. In addition, a fee collection system using a telephone line need not be installed in the broadcast center. It simplifies the system configuration.

In this pay per view system described above, since the TV broadcast channel is used as a charge link, an error may occur in advance information due to atmospheric or airplane noise. However, since the TV broadcast channel is a one-way transmission line, the transmitting center (i.e., the broadcast center) cannot detect a transmission error.

SUMMARY OF THE INVENTION

The present invention solves the conventional drawbacks described above. It is an object of this invention to provide a pay per view system wherein an advance information error can be detected at a receiving end or at a user's terminal, and a feedback path can be substantially formed to acknowledge the error so that the broadcast center corrects the error.

In order to achieve the above and other objects of the present invention, there is provided a receiver for pay television, comprised of the following. An advance memory is provided for storing advance data which correspond to a deposit of a user and which is transmitted form a broadcast station. Means are provided for subtracting a program fee from the advance data upon every reception of a pay program. Means are provided for detecting the advance data. Finally, means for indicating an advance data transmission error is provided.

According to the present invention, a fee collection system works by employing data transmission through a broadcast channel, and an advance data transmission error can be acknowledged to the broadcast station.

BRIEF DESCRIPTION OF THE DRAWINGS

FIGS. 5, 6, 7, 9, 10, 12, 13, and 15 are flow charts for explaining the operation of the pay per view system.

DESCRIPTION OF THE PREFERRED EMBODIMENTS

The present invention will be described with reference to an embodiment which exemplifies an information transmission system utilizing a broadcast satellite channel. The present invention may be applied to a normal TV broadcast system or a CATV (cable television) system.

Figure 1:
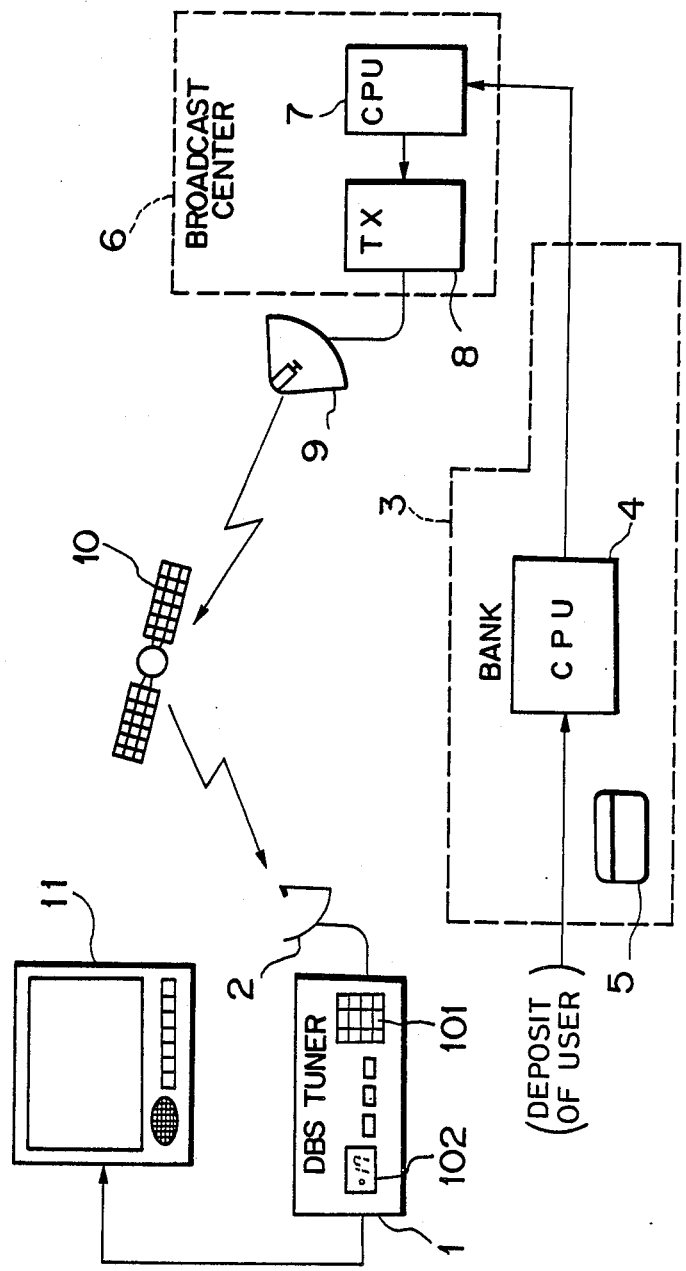
FIG. 1 is a block diagram of a pay per view system using a DBS (Direct Broadcast Satellite) channel.

FIG. 1 is a block diagram of a pay per view system utilizing a DBS (Direct Broadcast Satellite) channel. A direct broadcast wave from a broadcast satellite 10 is received by a parabolic antenna 2 and is demodulated by a DBS tuner 1. The broadcast signal subjected to predetermined scrambling and transmitted to a tuner is decoded (descrambled) by a decoder in the tuner 1. The descrambled program is received by a user on a television monitor 11.

In this pay per view system, each user (i.e., a subscriber) deposits advance money with a cash card 5 or the like from a bank 3 to a broadcast center 6. The advance data is transmitted from a computer 4 of the bank 3 to a computer 7 of the broadcast center 6. The advance data or deposit data is then transmitted from the center 6 to the user through a broadcast satellite link by utilizing a PCM data region or a vertical blanking period of a TV signal. Each data is assigned with an individual user's ID code, and composite data is transmitted from a transmitter 8 to the broadcast satellite 10 through a transmitting parabolic antenna 9. The data is then sent from the broadcast satellite 10 to the tuner 1 of each user through the receiving parabolic antenna 2.

The tuner 1 (decoder) of each user has an advance memory for storing the advance data deposited by the user through the bank. The advance data is displayed on a data display unit 102 in the tuner 1. When a pay program is transmitted to the user, "per per view" program status data is supplied from the broadcast center 6 to the user through the broadcast satellite channel upon broadcasting. When the user wishes to watch this pay program, he performs channel selection and a key code input for execution of pay per view with a ten-key pad 101 or the like in tuner 1. The decoder descrambles the scrambled program to be watched on a television monitor 11.

At the same time, data corresponding to the program fee is subtracted from the advance money memory in the decoder. Thus, the pay per view operation is brought to effect.

When the advance data in the advance memory is decreased below a predetermined value by several subtractions, a message requesting an additional deposit is displayed on the TV screen or the display unit 102.

Figure 2:
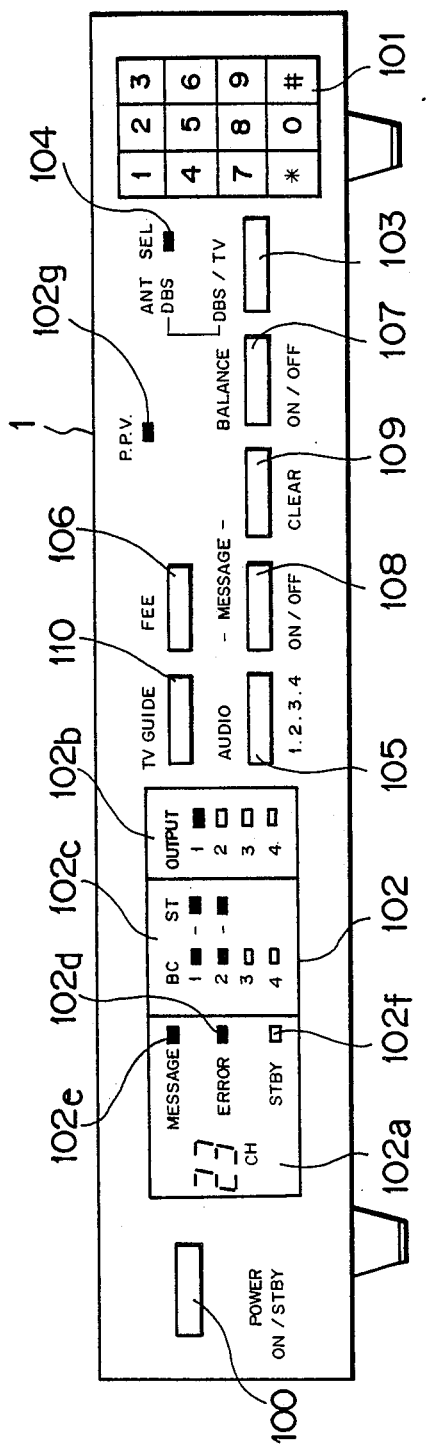
FIG. 2 is a front view of a front panel on a subscriber's tuner.
Figure 3:
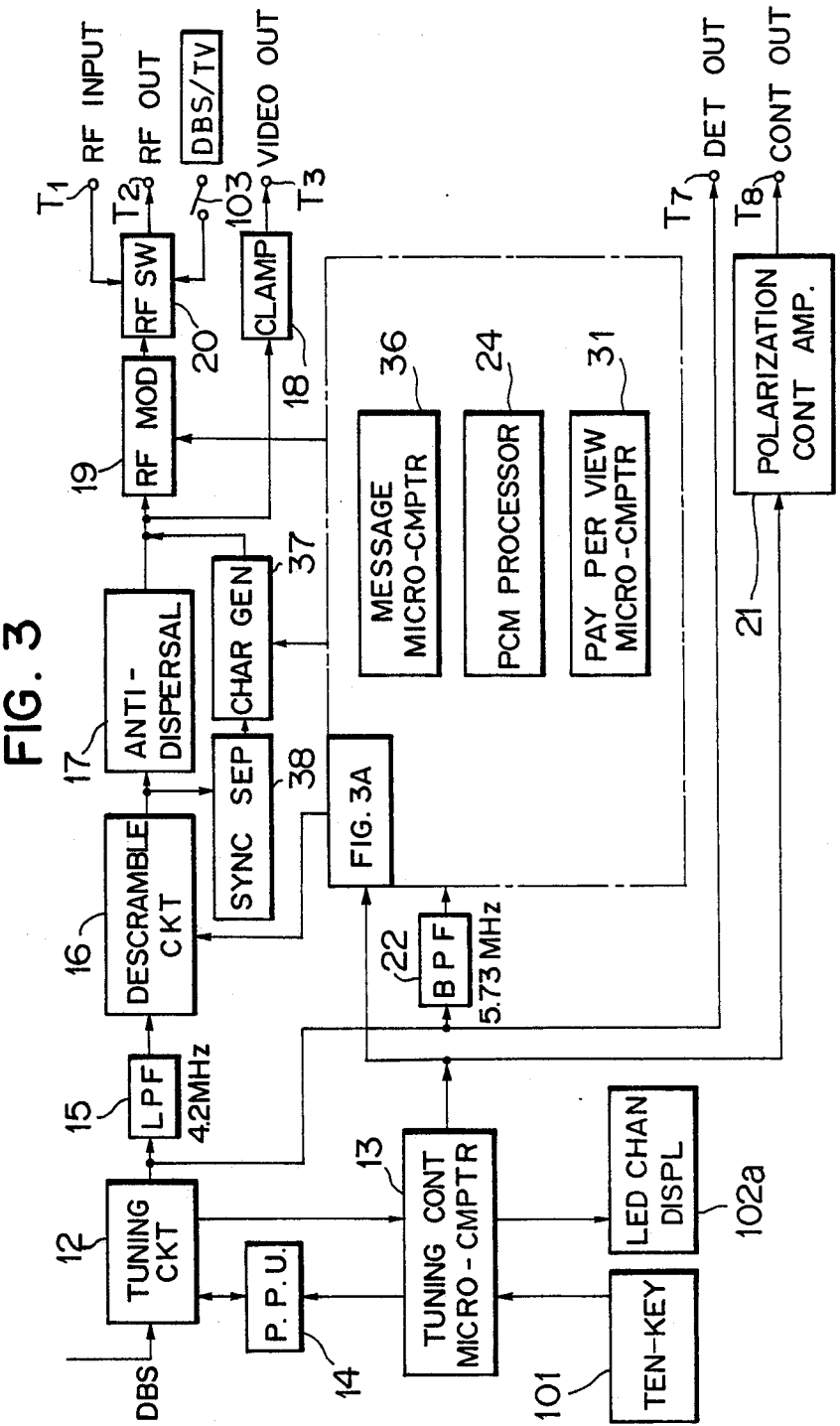
FIGS. 3 and 3A are block diagrams showing a main portion of the tuner.
Figure 3A:
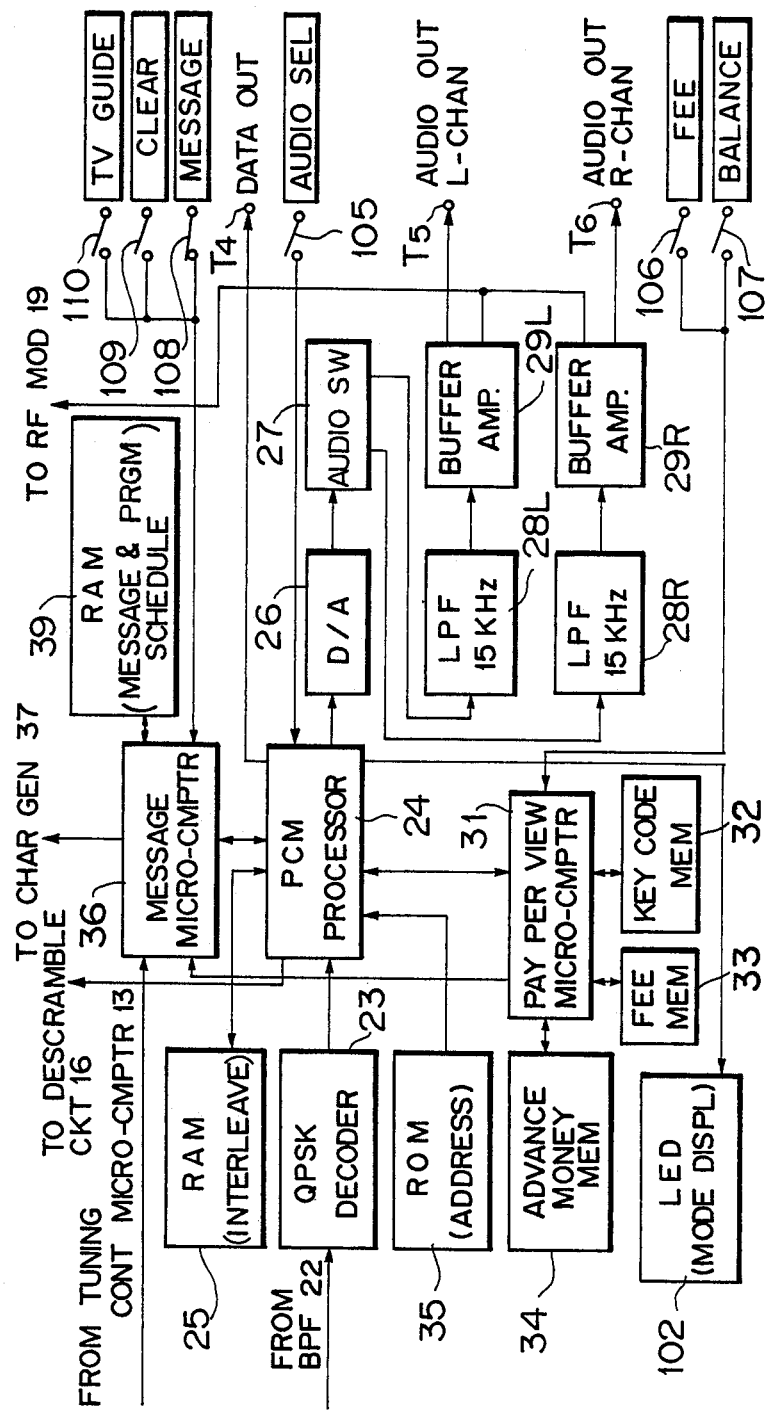

FIG. 2 is a front view of an operation panel of the DBS tuner 1 of FIG. 1, and FIGS. 3 and 3A is a block diagram of the tuner 1 (indoor unit).

When the user depresses a power switch 100 on the operation panel, the tuner 1 is set in the standby state, and a standby LED 102f in the display unit 102 is turned on.

Referring to FIGS. 3 and 3A, in the standby state a DBS reception signal is supplied to a tuning circuit 12. The DBS reception signal is tuned and detected by the tuning circuit 12 and is supplied as a video signal, e.g., a NTSC signal to a video processing stage. An output from the tuner circuit 12 is also supplied as a detection output to an output terminal T7. Tuning is performed in the ten-key pad 101, and a micro-computer 13 for tuning control supplies a tuning signal to the tuning circuit 12 through a PLL prescaler unit 14 in response to tuning operation data. A channel number is displayed by a channel display LED k102a (FIG. 2) in the display unit 102.

A polarization discrimination signal from the microcomputer 13 appears as a control output at an output terminal T8 through a polarization control amplifier 21. The control output from the terminal T8 is supplied to an outdoor unit (SHF-to-UHF converter) built in the parabolic antenna 2.

A high-frequency PCM region component of the video signal as an output from the tuner circuit 12 is eliminated by a low-pass filter (LPF) 15. The scrambled signal is descrambled by a descrambling circuit 16. The spectrum of a signal transmitted with energy dispersal restores the original spectrum by means of an anti-dispersal circuit 17. An output from the anti-dispersal circuit 17 appears at a video output at an output terminal T3 through a clamper 18. An output at the output terminal T3 is supplied to the television monitor 11.

In order to couple a VTR, a video output from the anti-dispersal circuit 17 is modulated by an RF modulator 19 to an RF signal of a proper TV channel frequency. The RF signal is supplied from an RF output terminal T2 to the VTR through an RF switch 20. An antenna reception signal of a VHF or UHF television broadcast wave is also supplied from an input terminal T1 to the RF switch 20. the VHF or UHF television broadcast signal and the RF output are switched and selectively supplied to the terminal T2. This switching operation is performed by a DBS/TV switching button 103 of FIG. 2. When the DBS tuner is selected, a DBS LED 104 is turned on in synchronism with the switching button 103.

PCM area data included in the high-frequency component of the output from the turner circuit 12 is extracted by a band-pass filter (BPF) 22. The extracted 4-phase (QPSK) modulated data is demodulated by a QPSK decoder 23 and is supplied to a PCM processor 24.

Figure 4:
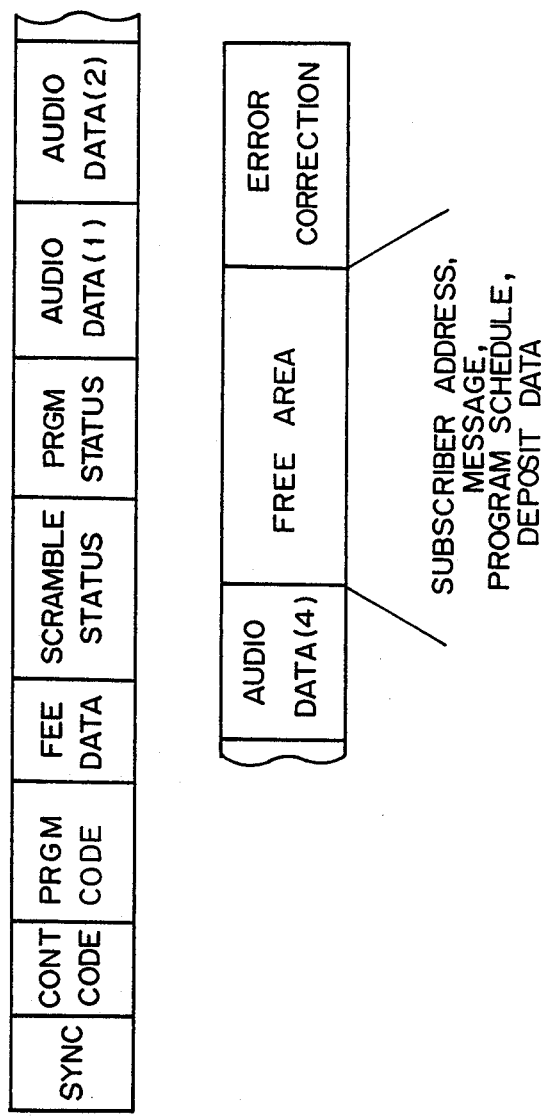
FIG. 4 is a format of transmitted data.

FIG. 4 is a one-frame format of output data from the decoder 23. A control code such as a stereo/monaural code is sent following a data sync (SYNC). In addition, when a pay program is transmitted, a program code, fee data, and scramble status data are sent. Program status data (i.e., free program, pay program by reservation, or pay per view program discrimination status data) follows the scramble status data. Subsequently, four types of audio data (1) to (4) are transmitted. In the next free area, a specific subscriber message and advance (deposit) data are sent together with a subscriber address (ID data). Within this region, the program schedule is also sent. The last one-frame data comprises an error correction code.

The PCM processor 24 de-interleaves the data of FIG. 4 in response to an output from a RAM 25 for storing de-interleaving data, and also performs error correction in accordance with an error correction code. When a transmitted program is a pay program, the PCM processor 24 descrambles audio data in accordance with the scramble status data. At the same time, the scrambled data is also supplied to the video descrambling circuit 16, so that the video signal is descrambled.

Processed outputs from the PCM processor 24 appear as L and R channel audio outputs at output terminals T5 and T6 through a D/A converter 26, a stereo/monaural audio switch 27, low-pass filters 28L and 28R, and buffer amplifiers 29L and 29R.

Upon operation of an audio selection button 105 in the operation panel of FIG. 2, one of the four types of audio data (1) to (4) can be selected. A selection number is indicated by ON states of LEDs 102b in the display unit 102. At the same time, the station number of the DBS broadcast and the stereo/monaural mode are indicated by the LEDs 102c.

Figure 5:
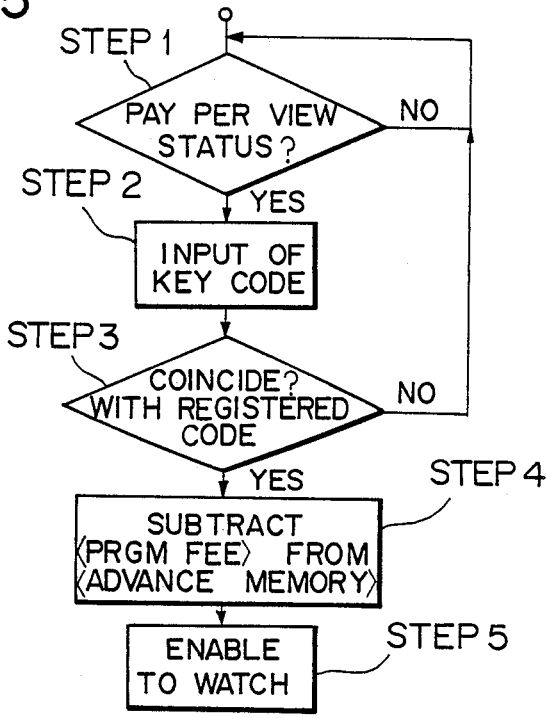

At the time of reception of the pay per view program, "pay per view" program status data is transmitted together with fee data. As shown in a flow chart of FIG. 5, the PCM processor 24 detecting this status data in step 1 causes the pay per view LED 102g to flicker in order to acknowledge to the subscriber that the current program is a pay per view program.

When the subscriber wishes to watch this program, he enters a key code with the ten-key pad 101 of the tuner 1 in step 2. The entered key code is supplied from the micro-computer 13 to a pay per view micro-computer 31. The entered key code is compared for identification with a user-defined code registered in a key code memory 32 in step 3. When a coincidence is detected in step 4, the program fee is subtracted from the advance data in an advance memory 34. Thereafter, predetermined descrambling is performed, and the subscriber can watch the desired program (step 5). Thus, only the person who knows the key code can watch the program. Therefore, children cannot watch adult programs, and the subscriber will not be charged due to mischevious tuning operation by children.

The fee data transmitted from the broadcast station is stored in a fee memory 33 and is displayed on the TV screen for a short period of time, e.g., three seconds. When the user depresses a fee button 106 in the operation panel of FIG. 2, the program fee can be displayed at any time on the screen during program listening.

Figure 6:
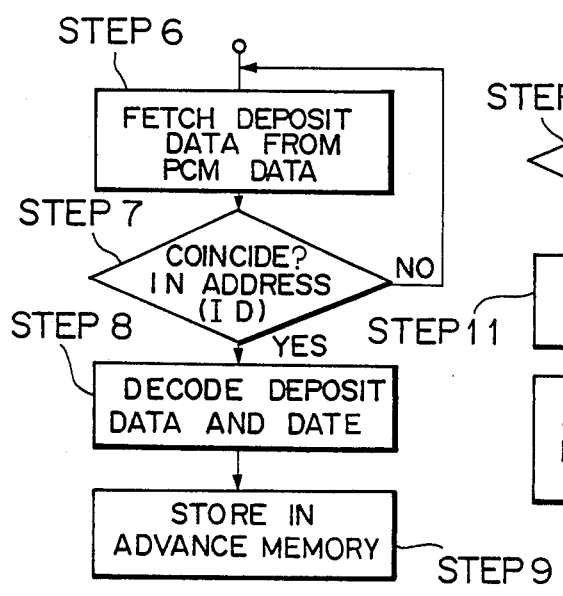

When reception of the pay per view program starts, the program fee is subtracted from the advance data in the advance memory 34. Every time the subscriber deposits (transfers) an advance, the advance data is updated in the advance memory 34. The deposit data is transmitted from the broadcast center together with the subscriber address data by utilizing the free area of the PCM data, as indicated in the data format of FIG. 4. When the deposit data input is detected (step 6), as shown in a flow chart of FIG. 6, the pay per view micro-computer 31 compares (identifies) the transmitted address data with the subscribed address data stored in the ROM 35. When a coincidence is detected by the pay per view micro-computer 31, the deposit data and the date of deposit data are decoded (step 8), and the decoded data are stored in the advance memory 34 (step 9).

Figure 7:
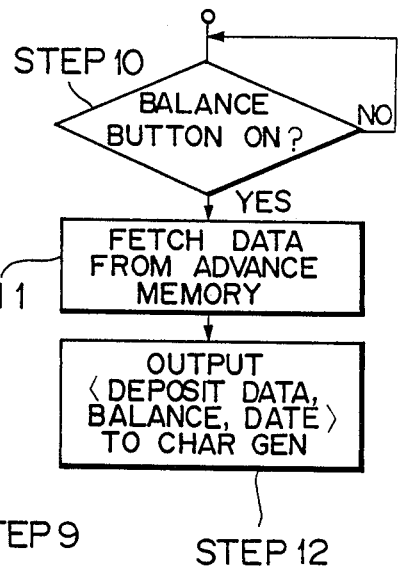

When a balance button 107 in the operation panel of FIG. 2 is depressed (step 10), a balance sheet of the advance memory 34 can be displayed on the screen any time, as shown by a flow chart of FIG. 7 (steps 11 and 12). As shown in the television screen of FIG. 8, the display contents are the deposit amount, the deposit date, and the balance for each channel. The subscriber can deposit an additional advance by checking the balance displayed on the television screen and judging whether or not an additional advance is required. The contents of the advance memory 34 are transferred from the pay per view micro-computer 31 to a message micro-computer 36. An output from the message micro-computer 36 is converted by a character generator 37 to a display signal. The display signal is thus displayed on the television screen. The character generator 37 is operated in response to a sync signal from the sync separator 38.

Figure 8:
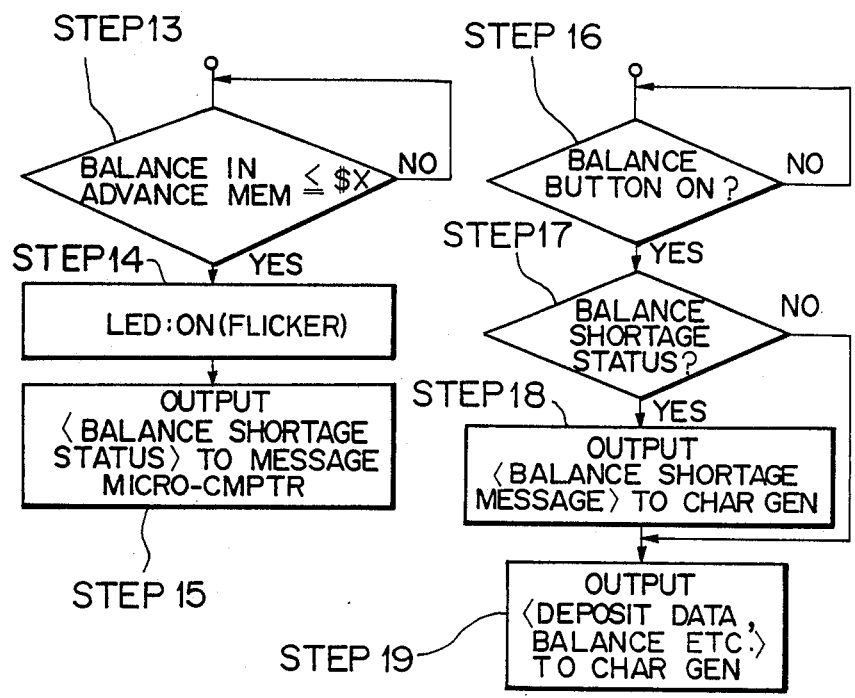
FIGS. 8, 11, and 14 are front views of a television screen which represents an advance balance statement, a balance shortage caution message, and a deposit data transmission error message, respectively.
Figure 11:
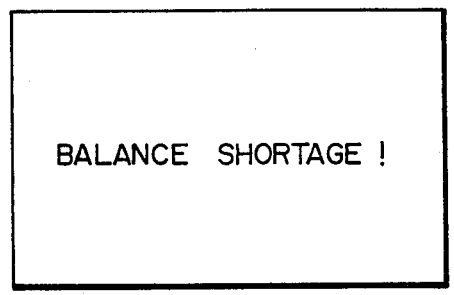

When the balance in the advance memory 34 decreases below a predetermined amount $X (step 13 of FIG. 9) as a result of watching pay per view programs a number of times, an error display LED 102d in the display unit 102 in the operation panel of FIG. 2 is turned on in step 14 in the flow chart of FIG. 9. A redeposit request (i.e., balance shortage status data) is generated from the pay per view micro-computer 31 and is transferred to the message micro-computer 36 (step 15). The message micro-computer 36 detects the balance shortage status (step 17) and supplies the balance shortage message data to the character generator 37 (step 18) when the balance button 107 is depressed in step 16, as shown in a flow chart of FIG. 10. The character generator 37 generates a character display signal corresponding to the message data. The character display signal is superimposed on the video signal from the anti-dispersal circuit 17. The superimposed signal is displayed as a message on the television screen. When a predetermined period of time, i.g. 10 seconds, has elapsed, the same balance sheet as in FIG. 8 is displayed (step 19).

Figures 12, 13:
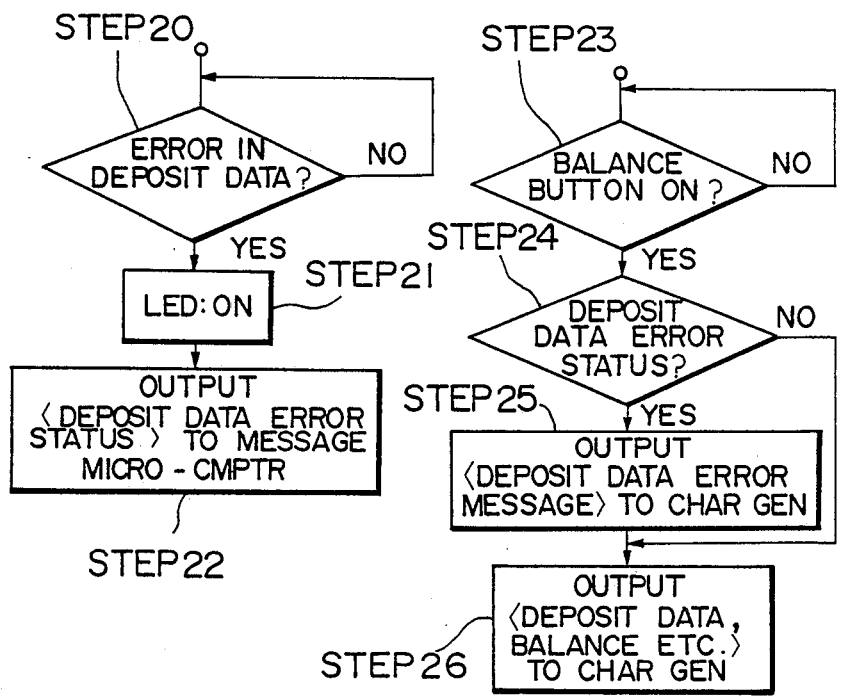

The pay per view micro-computer 31 checks whether or not there is an error in the deposit advance data transmitted from the broadcast center 6. The error check is performed by, for example, a decision by majority. Identical data is transmitted five consecutive times. When three out of five pieces of data coincide with each other, the pay per view micro-computer 31 determines that no transmission error occurs in deposit data. However, when only two data are detected to be coincident, with the remaining three data being inconsistent, the micro-computer 31 determines that a transmission error has occurred in the deposit data. When the micro-computer 31 determines in step 20 that a data transmission error has occurred, as shown in the flow chart of FIG. 12, the operation panel error display LED 102d flickers in step 21 and an error status flag data is supplied to the message micro-computer 36 in step 22.

Figure 14:
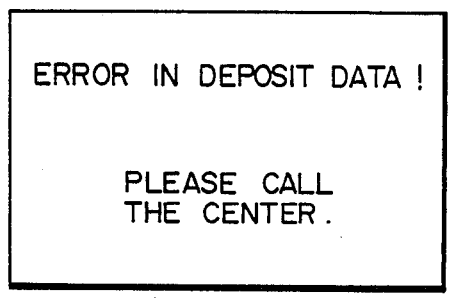

When the user notices flickering, he depresses the balance button 107 in step 23. As shown in the flow chart of FIG. 13, the message micro-computer 36 detects the data error status (step 24) and supplies to the character generator 37 a message representing "error in deposit data" in step 25. The message shown in FIG. 14 is displayed on the television screen in accordance with the output from the character generator 37. When 10 seconds have elapsed, the balance statement is displayed in step 26 in the same manner as in FIG. 8. The user calls the center after checking the balance statement and asks for the deposit data to be resent.

The deposit data is sent again, and the correct deposit data is stored in the advance memory 34. However, the broadcast center 6 cannot determine that a transmission error actually occurs. A double deposit money entry may be performed due to a false claim for data transmission error. For this reason, the pay per view micro-computer 31 prevents a double advance money entry by referring to advance deposit date data transmitted together with the deposit data.

Figure 15:
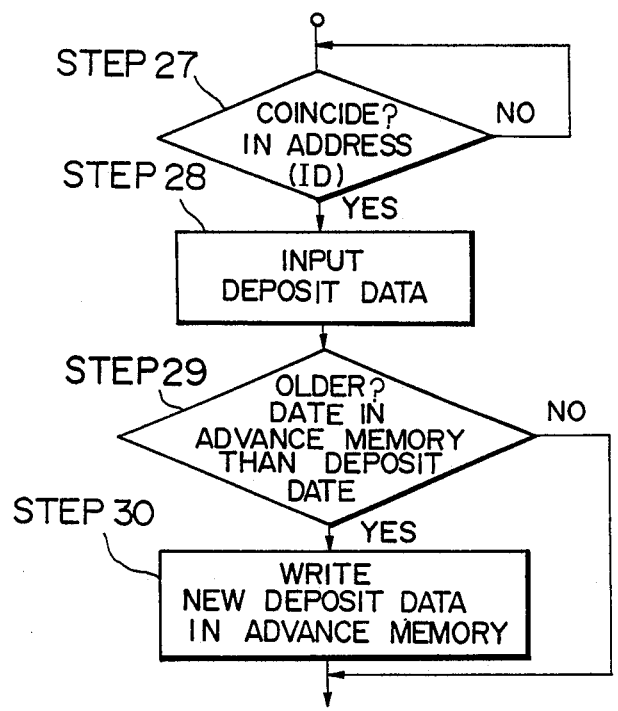

In a flow chart of FIG. 15, when an address (ID) assigned to the advance data coincides with the subscriber address in step 27, the deposit data is stored in the advance memory 34. In this case, the new deposit data is written in the memory 34 in step 28 only when the advance (deposit) date data represents a date later than the date in the advance deposit data memory 34. When the date of the deposit data transmitted from the broadcast center coincides with that of the data stored in the memory 34, or is older, new deposit data will not be stored in the advance memory 34. Therefore, a double deposit in the memory can be prevented in steps 29 and 30.

Alternatively, a deposit serial number data can be transmitted together with the advance data, so that the advance data can be stored in the memory 34 only when the advance serial number data is incremented.

When a message (private message) to a specific subscriber is included in the free region of the PCM data of FIG. 4, the subscriber address is compared with a destination address attached to the message data. When a coincidence is detected by the PCM processor 24, the message is stored in a RAM 39 through the message micro-computer 36. Message reception is indicated by the message LED 102e in the display unit 102 of FIG. 2.

When the subscriber notices that the LED 102e is turned on, he depresses a message button 108 in the operation panel. The message data is read out from the RAM 39, and the readout data is supplied to the character generator 37 through the message micro-computer 36. The character signal output is displayed as message characters on the display screen. This display can be cancelled upon depression of the message button 108 again. When a clear button 109 in the operation panel is depressed, the message data can be erased from the RAM 39.

The message RAM 39 has an area for storing the program schedule transmitted by utilizing the free region of the PCM data. When the user wishes to watch the program schedule, he depresses a TV guide button 110 in the operation panel of FIG. 2. The program schedule data is upplied from the PCM processor 24 and is stored in the RAM 39 through the message micro-computer 36. The data read out from the RAM 39 is converted by the character generator 37 to a character signal as a video signal. Thus, the program schedule is displayed on the television screen.

As is apparent from the above description, data relating to the advance money deposited by the user is transmitted from the broadcast station and is stored in the advance memory of the user, and the program fee is subtracted from the advance data stored in the advance memory every time the user watches a pay program. The user can watch desired programs any time without reservations. The broadcast center need not install an expensive fee collection system using, for example, a telephone line, but needs only a simple charge system which transmits deposit data and program fee data to the user through the broadcast channel.

Furthermore, a data transmission error is detected and displayed on the display unit or television screen. Even if the broadcast center cannot detect the transmission error since a one-way broadcast channel is used in the charge system, the user can find the transmission error and call the broadcast center to ask for the error to be corrected. In other words, even if a one-way communication path is used, a substitute for a feedback path for transmission error correction is provided. Thus, a charge system is provided with high reliability.

Although various minor changes and modifications might be proposed by those skilled in the art, it will be understood that we wish to include within the claims of the patent warranted hereon all such changes and modifications as reasonably come within our contribution to the art.

We claim as our invention:

1. A payment control apparatus at a remote subscriber station in a pay per view pay television system, comprising:

means for descrambling a selected video program transmitted from a center to the remote subscriber station;

means for decoding control data transmitted from said center, said control data including an advance deposit amount for each pay per view channel, a deposit date for each advance deposit amount, and program fee data for each channel and program;

memory means for storing at least a last advance deposit amount for each of a plurality of channels, and the deposit date for each advance deposit amount;

advance memory means for maintaining a current running balance for each channel;

adding means connected to the advance memory means for increasing the running balance for each channel with each advance deposit amount for that channel;

subtracting means connected to the advance memory means for subtracting the program fee data on a given channel when a program is received from the running balance for each such given channel;

activating means connected to said memory means for activating said means for descrambling said selected video program after checking that the running balance is not below a predetermined amount on the channel corresponding to the selected program;

means for comparing a deposit date of a new deposit amount and the deposit date of a last deposit amount to check validity of the new deposit amount; and means for simultaneously displaying upon viewer request each channel, the most recent deposit amount for each channel, the running balance for each channel, and the date of the most recent deposit amount for each channel.

2. An apparatus according to claim 1 wherein said means for comparing checks whether the date of the last advance deposit amount for a given channel is older than a date of the new advance deposit amount being currently received, and if it is older, then updating the corresponding running balance with the new deposit amount.

3. An apparatus according to claim 2 wherein the advance deposit amount is transmitted to the remote subscriber station a plurality of times, and means are provided at the remote subscriber station for checking whether the advance deposit amount being currently received is the same for a majority of the times that it is sent.

4. An apparatus according to claim 2 wherein means are provided for providing a message to the subscriber when the running balance in the advance memory means falls below said predetermined amount.

5. An apparatus according to claim 2 wherein means are provided for checking an address ID transmitted along with the control data with an address ID of the subscriber station.

6. An apparatus according to claim 2 wherein means are provided for decoding a unique subscriber message sent to the remote subscriber station.

7. A payment control apparatus at a remote subscriber station in a pay per view pay television system, comprising:

means for descrambling a selected video program transmitted from a center to the remote subscriber station;

means for decoding control data transmitted from said center, said control data including an advance deposit amount for each pay per view channel representing a most recent payment by a subscriber, a deposit date for each advance deposit amount, a subscriber address associated with the subscriber, and program fee data for each channel and program;

memory means for storing at least a last advance deposit amount for each of a plurality of channels, and the deposit date for each advance deposit amount;

advance memory means for maintaining a current running balance for each channel;

adding means connected to the advance memory means for increasing the running balance for each channel with each advance deposit amount for that channel;

subtracting means connected to the advance memory means for subtracting the program fee data on a given channel when a program is received from the running balance for each such given channel;

activating means connected to said memory means for activating said means for descrambling said selected video program after checking that the running balance is not below a predetermined amount on the channel corresponding to the selected program;

means for comparing a deposit date of a new deposit amount and the deposit date of a last deposit amount to check validity of the new deposit amount; and means for displaying upon viewer request for each channel the most recent deposit amount for each channel, the running balance for each channel, and the date of the most recent deposit amount for each channel.

* * * * *